(12) United States Patent
Nakajima et al.

(10) Patent No.: US 8,136,380 B2
(45) Date of Patent: Mar. 20, 2012

(54) SPLINE MEMBER MANUFACTURING APPARATUS AND MANUFACTURING METHOD

(75) Inventors: Masaki Nakajima, Anjo (JP); Hideyuki Nagai, Anjo (JP); Kazushi Nagashima, Anjo (JP); Ariyoshi Terao, Anjo (JP)

(73) Assignee: Aisin AW Co., Ltd., Aichi-Ken (JP)

( * ) Notice: Subject to any disclaimer, the term of this patent is extended or adjusted under 35 U.S.C. 154(b) by 764 days.

(21) Appl. No.: 12/237,873

(22) Filed: Sep. 25, 2008

(65) Prior Publication Data
US 2009/0084154 A1  Apr. 2, 2009

(30) Foreign Application Priority Data
Sep. 26, 2007  (JP) ................ 2007-249140

(51) Int. Cl.
*B21J 13/00* (2006.01)
(52) U.S. Cl. .............. 72/354.6; 72/355.2; 72/359
(58) Field of Classification Search .......... 72/352, 72/353.2, 355.4, 355.6, 353.6, 354.2, 354.6, 72/355.2, 356, 358, 353.4, 326–328, 359
See application file for complete search history.

(56) References Cited

U.S. PATENT DOCUMENTS 5,492,001 A * 2/1996 Sasaki et al. .......... 72/359
2004/0035000 A1  2/2004 Nakajima et al.

FOREIGN PATENT DOCUMENTS

| JP | 10-166102 A | 6/1998 |
|----|-------------|--------|
| JP | 2001-108027 A | 4/2001 |
| JP | 2003-10921 A | 1/2003 |
| JP | 2004-034037 A | 2/2004 |
| JP | 2007-64889 A | 3/2007 |

* cited by examiner

*Primary Examiner* — Debra Sullivan
(74) *Attorney, Agent, or Firm* — Sughrue Mion, PLLC

(57) ABSTRACT

A spline member manufacturing apparatus includes a shaving punch, a shaving die, a spline punch, and a stripper. The stripper supports a first surface of a base plate portion and an outer circumferential surface of a boss portion. The shaving punch is advanced relatively, while a material and the stripper are being pressed so that cutout portions are formed in an outer circumference portion of the base plate portion by the shaving punch and the shaving die. The shaving punch is further advanced relatively while the outer circumferential surface of the base plate portion is held by the shaving die, so that a spline portion is formed by inserting the spline punch along the inner circumferential surface of the boss portion.

6 Claims, 7 Drawing Sheets

SPLINE MEMBER MANUFACTURING APPARATUS AND MANUFACTURING METHOD

INCORPORATION BY REFERENCE

The disclosure of Japanese Patent Application No. 2007-249140 filed on Sep. 26, 2007 including the specification, drawings and abstract is incorporated herein by reference in its entirety.

BACKGROUND OF THE INVENTION

1. Field of the Invention

The present invention relates to a manufacturing apparatus and a manufacturing method for a spline member obtained by forming a spline portion in a boss portion that is in the shape of a circular tube.

2. Description of the Related Art

Spline members are widely used as, for example, automobile parts, the spline members each being obtained by forming a spline portion in a circular-tube shaped boss portion (see Japanese Patent Application Publication No. JP-A-2004-34037).

Generally speaking, such a spline member is manufactured by using a material having a plate-like base plate portion and the circular-tube shaped boss portion that is provided so as to project from the base plate portion and by forming the spline portion in the boss portion along the axial direction.

SUMMARY OF THE INVENTION

According to a known manufacturing method, before a spline forming step of forming the spline portion is performed, a shaving step is performed so as to form cutout portions in the outer circumference portion of the base plate portion and process the base plate portion so that it has a desired exterior shape. However, because the shaving step and the spline forming step are performed separately, the levels of coaxiality and positional precision of the cutout portions with respect to the spline portion are insufficient in the obtained spline member.

In view of the problem in the known manufacturing method, it is an object of the present invention to provide a spline member manufacturing apparatus and a spline member manufacturing method that are able to achieve sufficient levels of coaxiality and positional precision of cutout portions with respect to a spline portion.

A first aspect of the present invention provides a spline member manufacturing apparatus that manufactures a spline member having a spline portion including ridge portions that are formed along an axial direction on an inner circumferential surface of a boss portion and groove portions that are formed between the ridge portions so that the ridge portions and the groove portions alternate, by using a material including a plate-like base plate portion and the boss portion that is in a shape of a circular tube and is provided so as to project from a first surface that is one of surfaces of the base plate portion, the spline member manufacturing apparatus including:

a shaving punch and a shaving die that are used for forming a cutout portion in at least a part of an outer circumference portion of the base plate portion;

a spline punch that is inserted along the inner circumferential surface of the boss portion and is used for forming the spline portion; and a stripper that supports the first surface of the base plate portion and an outer circumferential surface of the boss portion.

In the spline member manufacturing apparatus, the shaving punch, the shaving die, the spline punch, and the stripper are positioned coaxially, while the stripper is positioned on an outer circumference side of the spline punch, whereas the shaving die is positioned on an outer circumference side of the stripper, and the shaving punch is positioned so as to be opposite to the stripper in the axial direction, the shaving punch being provided so as to be movable in the axial direction relative to the shaving die and the spline punch, and the stripper being provided so as to make a relative retreating movement due to a pressing force of the shaving punch, the stripper supports the first surface of the base plate portion and the outer circumferential surface of the boss portion, the shaving punch is relatively advanced toward the stripper and contacts a second surface of the base plate portion, the second surface being a surface on an opposite side of the first surface, and the shaving punch is further advanced relatively, while the material and the stripper are being pressed, and a shearing force is applied to the material by the shaving punch and the shaving die, so that the cutout portion is formed in at least a part of the outer circumference portion of the base plate portion, and the shaving punch is further advanced relatively, while an outer circumferential surface of the base plate portion is held by the shaving die, so that the spline portion is formed by inserting the spline punch along the inner circumferential surface of the boss portion.

The manufacturing apparatus according to the present invention includes, as described above, the shaving punch, the shaving die, the spline punch, and the stripper, which are positioned coaxially. By causing the shaving punch to advance, it is possible to form the cutout portion on the outer circumference portion of the base plate portion using the shaving punch and the shaving die. In addition, by causing the shaving punch to further advance, it is possible to form the spline portion by inserting the spline punch along the inner circumferential surface of the boss portion.

In other words, the manufacturing apparatus is configured so that the forming of the cutout portion and the forming of the spline portion are coaxially and sequentially performed on the material with one stroke of the shaving punch, while using the shaving punch, the shaving die, the spline punch, and the stripper that are positioned coaxially. Thus, the spline member obtained in this manner is able to achieve sufficient levels of coaxiality and positional precision of the cutout portion with respect to the spline portion.

In addition, the manufacturing apparatus according to the present invention is configured so that, after the cutout portion is formed, the spline portion is formed by causing the shaving punch to advance relatively, while having the outer circumferential surface of the base plate portion held by the shaving die. In other words, it is possible to form the spline portion while maintaining the axis and the radial-direction position of the cutout portion that has been formed, because the outer circumferential surface including the processed surface of the base plate portion is held. As a result, it is possible to further enhance the levels of coaxiality and positional precision of the cutout portion with respect to the spline portion.

For example, as shown in a second exemplary embodiment described later, in a case where the spline member is used as a carrier cover for a planetary gear in an automatic transmission, the cutout portion formed on the outer circumference portion of the base plate portion serves as a joint portion to be joined to the carrier. Thus, it is possible to improve the level of precision of the joint between the carrier cover and the carrier.

As explained above, according to the present invention, it is possible to provide a spline member manufacturing apparatus that is able to achieve sufficient levels of coaxiality and positional precision of the cutout portion with respect to the spline portion.

A second aspect of the present invention provides a spline member manufacturing method for manufacturing the spline member by using the spline member manufacturing apparatus according to the first aspect of the present invention described above, the spline member manufacturing method including:

supporting the material by causing the stripper to support the first surface of the base plate portion and the outer circumferential surface of the boss portion;

causing the shaving punch to advance relatively toward the stripper and to abut against the second surface of the base plate portion, causing the shaving punch to further advance relatively, while pressing the material and the stripper, and applying the shearing force to the material with the shaving punch and the shaving die, so that the cutout portion is formed in at least a part of the outer circumference portion of the base plate portion; and forming the spline portion by causing the shaving punch to further advance relatively, while having the outer circumferential surface of the base plate portion held by the shaving die, so that the spline portion is formed by inserting the spline punch along the inner circumferential surface of the boss portion.

According to the manufacturing method of the present invention, the material supporting step, the shaving step, and the spline forming step are performed as described above by using the spline member manufacturing apparatus according to the first aspect of the present invention.

In other words, according to the manufacturing method described above, the step of forming the cutout portion and the step of forming the spline portion are coaxially and sequentially performed on the material with one stroke of the shaving punch, while using the aforementioned manufacturing apparatus that includes the shaving punch, the shaving die, the spline punch, and the stripper that are positioned coaxially. Thus, the spline member obtained in this manner is able to achieve sufficient levels of coaxiality and positional precision of the cutout portion with respect to the spline portion.

In addition, according to the manufacturing method of the present invention, after the step of forming the cutout portion has been performed, the spline portion is formed by causing the shaving punch to advance relatively, while having the outer circumferential surface of the base plate portion held by the shaving die. In other words, it is possible to form the spline portion, while maintaining the axis and the radial-direction position of the cutout portion that has been formed, because the outer circumferential surface including the processed surface of the base plate portion is held. As a result, it is possible to further enhance the levels of coaxiality and positional precision of the cutout portion with respect to the spline portion.

As explained above, according to the manufacturing method of the present invention, it is possible to obtain a spline member that is able to achieve sufficient levels of coaxiality and positional precision of the cutout portion with respect to the spline portion.

A third aspect of the present invention provides a spline member manufactured by using the spline member manufacturing method according to the second aspect of the present invention described above.

The spline member according to the present invention is manufactured by using the spline member manufacturing method according to the second aspect of the present invention described above. Thus, the spline member is able to achieve sufficient levels of coaxiality and positional precision of the cutout portion with respect to the spline portion.

DETAILED DESCRIPTION OF THE EXEMPLARY EMBODIMENTS

Figure 1:
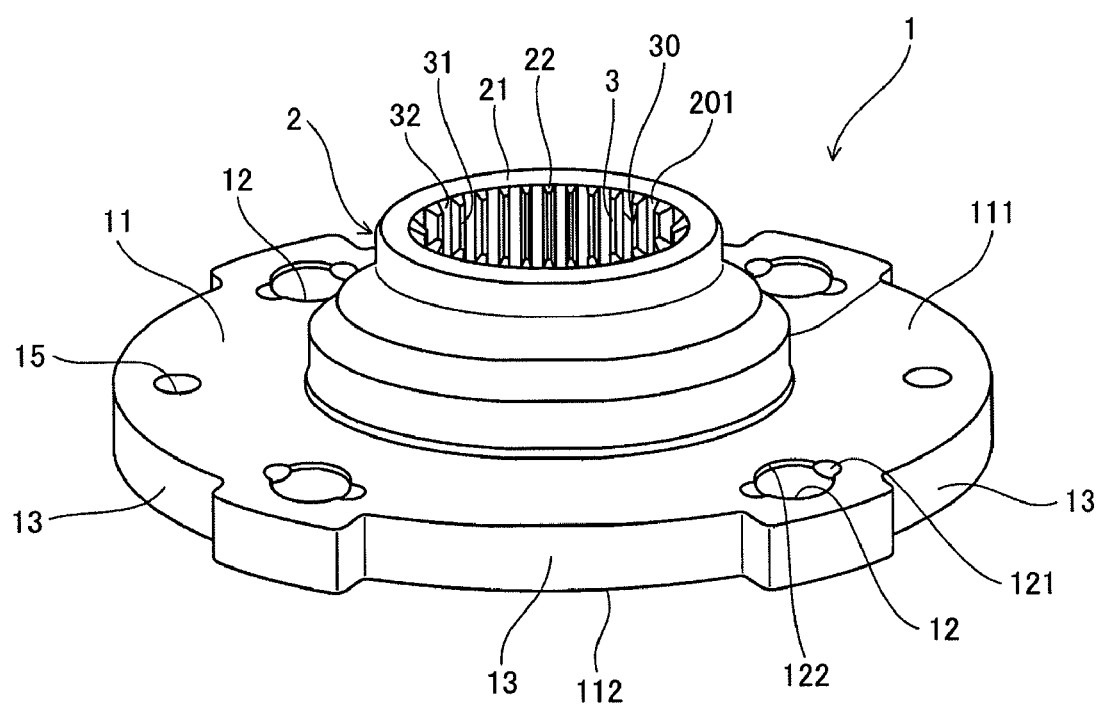
FIG. 1 is a drawing for explaining an overall structure of a spline member according to a first exemplary embodiment.

In the first aspect of the present invention described above, it is preferable to have an arrangement in which the spline member manufacturing apparatus further includes a pressure receiving member that regulates the retreating movement of the stripper, and in which after the spline portion has been formed, the shaving punch is further advanced relatively so that the stripper contacts the pressure receiving member and the retreating movement of the stripper is stopped, and a coining process is applied to a predetermined position on the second surface of the base plate portion by the pressing force of the shaving punch.

With this arrangement, with one stroke of the shaving punch, it is possible to perform the coining process coaxially and sequentially, in addition to the forming of the cutout portion and the forming of the spline portion. Consequently, the obtained spline member is able to achieve a sufficient level of perpendicularity because the coining process portion on the second surface of the base plate portion is inhibited from having a misaligned plane with respect to the spline portion.

For example, as shown in the second exemplary embodiment described later, in a case where the spline member is used as a carrier cover for a planetary gear in an automatic transmission, the coining process portion serves as a seat for a washer of a pinion shaft. Thus, it is possible to improve the level of precision of the joint between the carrier cover and the pinion shaft.

In addition, it is preferable to have an arrangement in which the boss portion in the material is formed by a burring process.

With this arrangement, it is possible to form the boss portion easily with a high level of precision. Thus, it is possible to achieve a sufficient level of coaxiality between the inner circumferential surface and the outer circumferential surface of the boss portion. Consequently, it is possible to improve the quality of the obtained spline member.

In the second aspect of the present invention described above, it is preferable to have an arrangement in which, after the spline forming step has been performed, a coining process step is performed that causes the shaving punch to further advance relatively so that the stripper contacts the pressure receiving member and the retreating movement of the stripper is stopped, and applies the coining process to the predetermined position on the second surface of the base plate portion with the pressing force of the shaving punch.

With this arrangement, with one stroke of the shaving punch, it is possible to perform the coining process step coaxially and sequentially, in addition to the shaving step and the spline forming step. Consequently, the spline member obtained in this manner is able to achieve a sufficient level of perpendicularity because the coining process portion on the second surface of the base plate portion is inhibited from having a misaligned plane with respect to the spline portion.

In the second and third aspects of the present invention described above, it is preferable to have an arrangement in which the spline member is a carrier cover for a planetary gear in an automatic transmission.

With this arrangement, it is possible to improve the quality of the carrier cover. In addition, it is possible to improve the level of precision of the joint between the carrier cover and the carrier joined thereto.

It is also possible to apply the spline member to any other various parts each having the spline portion as described above.

First Exemplary Embodiment

A spline member manufacturing apparatus and a spline member manufacturing method according to an exemplary embodiment of the present invention will be explained, with reference to the accompanying drawings.

Figure 2A:
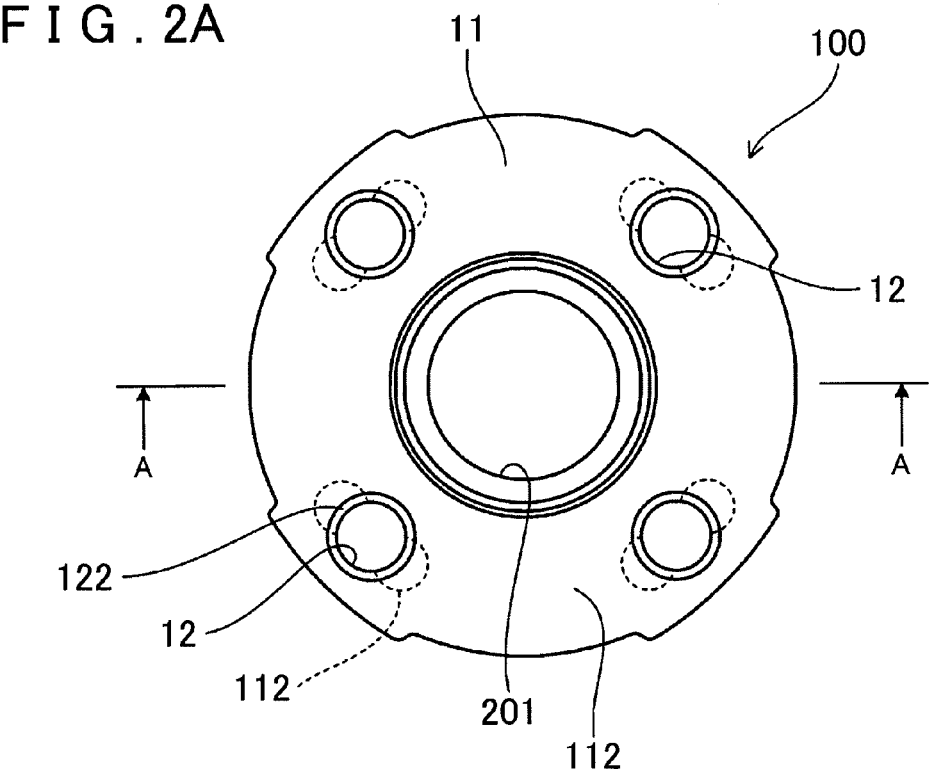
FIGS. 2A-2C are drawings for explaining a material used in the first exemplary embodiment.
Figure 2B:
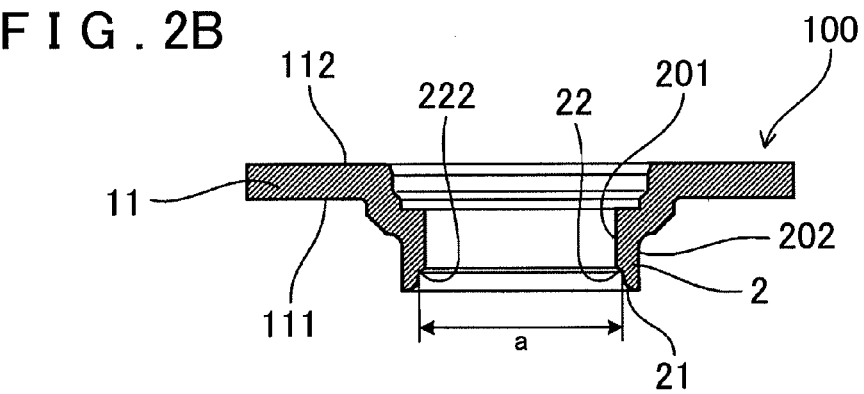
Figure 2C:
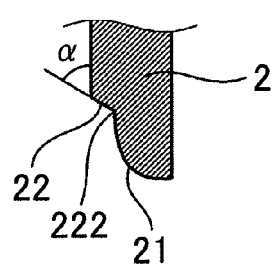
Figure 3:
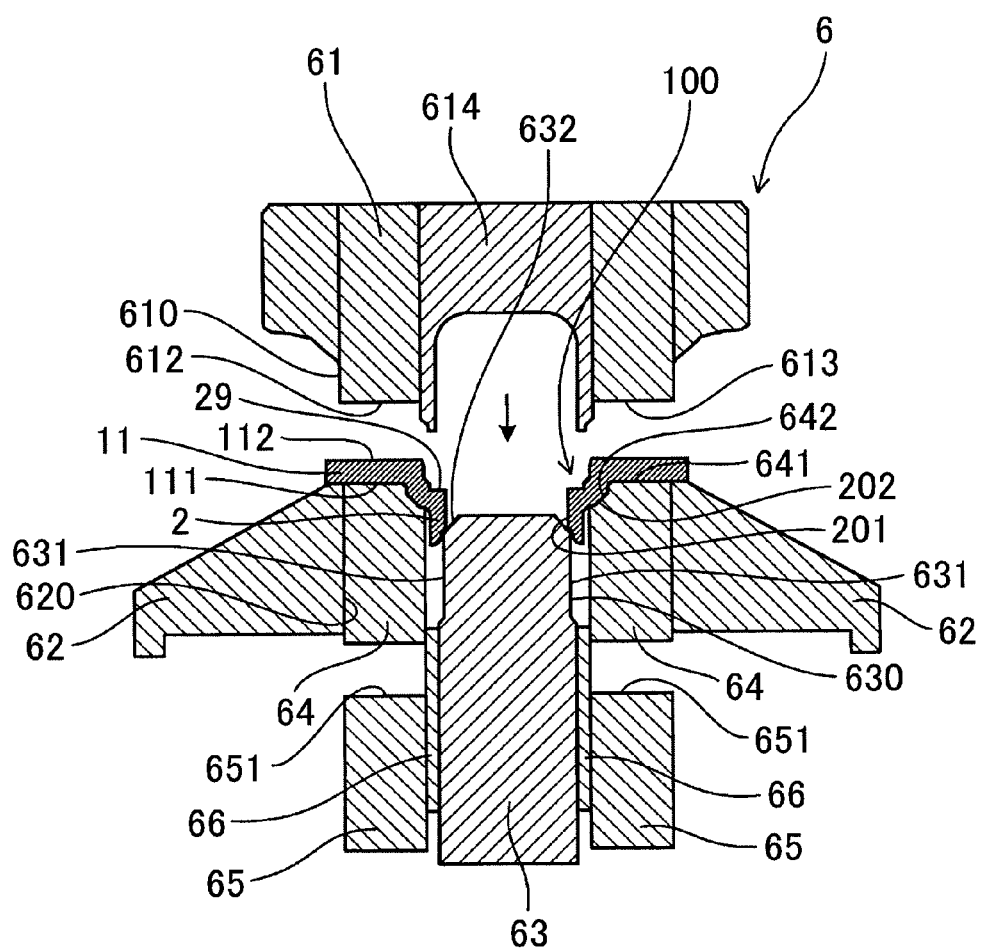
FIG. 3 is a drawing for explaining a state before a spline portion is formed, according to the first exemplary embodiment.
Figure 4A:
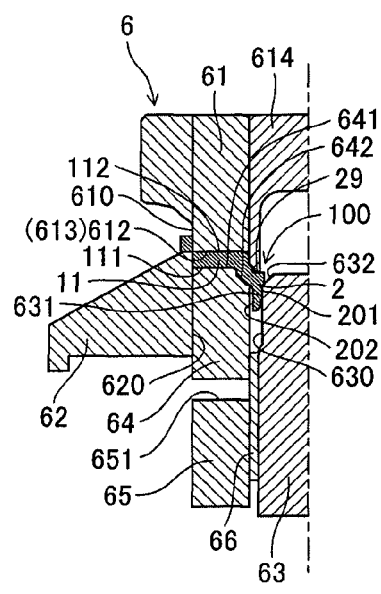
FIGS. 4A-4C are drawings for explaining a step of forming the spline portion according to the first exemplary embodiment.
Figure 4B:
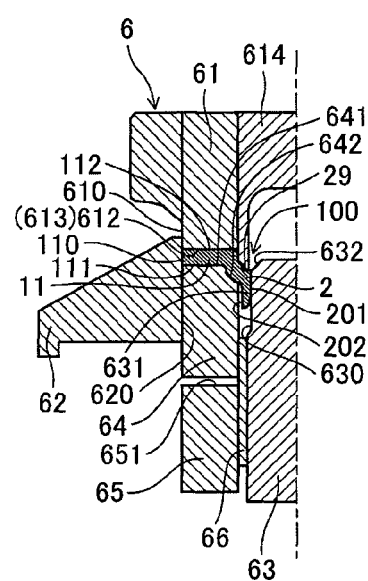

As shown in FIGS. 3, 4A, and 4B, a manufacturing apparatus 6 according to the present exemplary embodiment is a manufacturing apparatus that manufactures a spline member 1 (FIG. 1) having a spline portion 3 including ridge portions 31 that are formed along the axial direction on an inner circumferential surface 201 of a boss portion 2 and groove portions 32 that are formed between the ridge portions 31 so that the ridge portions 31 and the groove portions 32 alternate. To manufacture the spline member 1, the manufacturing apparatus 6 uses a material 100 (FIGS. 2A-2C) having a plate-like base plate portion 11 and the boss portion 2 that is in the shape of a circular tube and is provided so as to project from a first surface 111 that is one of the surfaces of the base plate portion 11.

The spline member 1 manufactured in the present exemplary embodiment is to be used as a carrier cover for a planetary gear in an automatic transmission.

As shown in FIG. 3, the manufacturing apparatus 6 includes: a shaving punch 61 and a shaving die 62 that are used for forming cutout portions 13 (FIG. 1) on the outer circumference portion of the base plate portion 11 of the material 100; a spline punch 63 that is inserted along the inner circumferential surface 201 of the boss portion 2 and is used for forming the spline portion 3; and a stripper 64 that supports the first surface 111 of the base plate portion 11 and an outer circumferential surface 202 of the boss portion 2.

The shaving punch 61, the shaving die 62, the spline punch 63, and the stripper 64 are positioned coaxially.

The stripper 64 is positioned on the outer circumference side of the spline punch 63, whereas the shaving die 62 is positioned on the outer circumference side of the stripper 64. The shaving punch 61 is positioned so as to be opposite to the stripper 64 in the axial direction.

The shaving punch 61 is provided so as to be movable in the axial direction relative to the shaving die 62 and the spline punch 63. The stripper 64 is provided so as to make a relative retreating movement due to a pressing force of the shaving punch 61.

As shown in FIGS. 3, 4A and 4B, the manufacturing apparatus 6 is configured so that the stripper 64 supports the first surface 111 of the base plate portion 11 and the outer circumferential surface 202 of the boss portion 2.

Also, the manufacturing apparatus 6 is configured so that the shaving punch 61 is relatively advanced toward the stripper 64 and contacts a second surface 112 of the base plate portion 11, the second surface 112 being the surface on the opposite side of the first surface 111. The shaving punch 61 is further advanced relatively, while the material 100 and the stripper 64 are being pressed. A shearing force is applied to the material 100 by the shaving punch 61 and the shaving die 62, so that the cutout portions 13 are formed on the outer circumference portion of the base plate portion 11.

Furthermore, the manufacturing apparatus 6 is configured so that the shaving punch 61 is further advanced relatively, while the outer circumferential surface of the base plate portion 11 is held by the shaving die 62. As a result, the spline portion 3 is formed by inserting the spline punch 63 along the inner circumferential surface 201 of the boss portion 2.

Next, the procedure above will be explained in detail.

The material 100 used in the present exemplary embodiment is made of steel (SAPH 440). As shown in FIGS. 2A to 2C, the material 100 includes the base plate portion 11 that is in the shape of a circular plate and the boss portion 2 that is in the shape of a circular tube and is provided so as to project from the first surface 111 of the base plate portion 1. The boss portion 2 is formed by a burring process.

In addition, as shown in the same drawings, a spline base point surface 22 is formed on the inner circumference side of a front end surface 21 of the boss portion 2, the spline base point surface 22 being used as a base point to form the spline portion 3. The maximum inside diameter "a" of the spline base point surface 22 is 36.2 millimeters and is equal to the inside diameter of an outer circumferential end 222 of the spline base point surface 22. The spline base point surface 22 is inclined so that the inside diameter thereof gradually becomes larger toward the front end of the boss portion 2. The inclination angle α of the spline base point surface 22 with respect to an axial direction line is 60° (FIG. 2C).

Also, as shown in FIGS. 2A to 2C, the material 100 according to the present exemplary embodiment has four first through holes 12 formed in the base plate portion 11. In addition, a dimple portion 121 is formed around each of the first through holes 12 on the first surface 111 of the base plate portion 11. Further, chamfered portions 122 that are tapered are formed around each of the first through holes 12 on the first surface 111 and on the second surface 112 of the base plate portion 11.

FIG. 3 shows the manufacturing apparatus 6 used in the present exemplary embodiment.

The manufacturing apparatus 6 according to the present exemplary embodiment includes the shaving punch 61, the shaving die 62, the spline punch 63, and the stripper 64, as described above. In addition, according to the present exemplary embodiment, the manufacturing apparatus 6 further includes a pressure receiving member 65 that regulates the retreating movement of the stripper 64 and a knock-out member 66 that is provided between the spline punch 63 and the stripper 64.

Figure 5A:
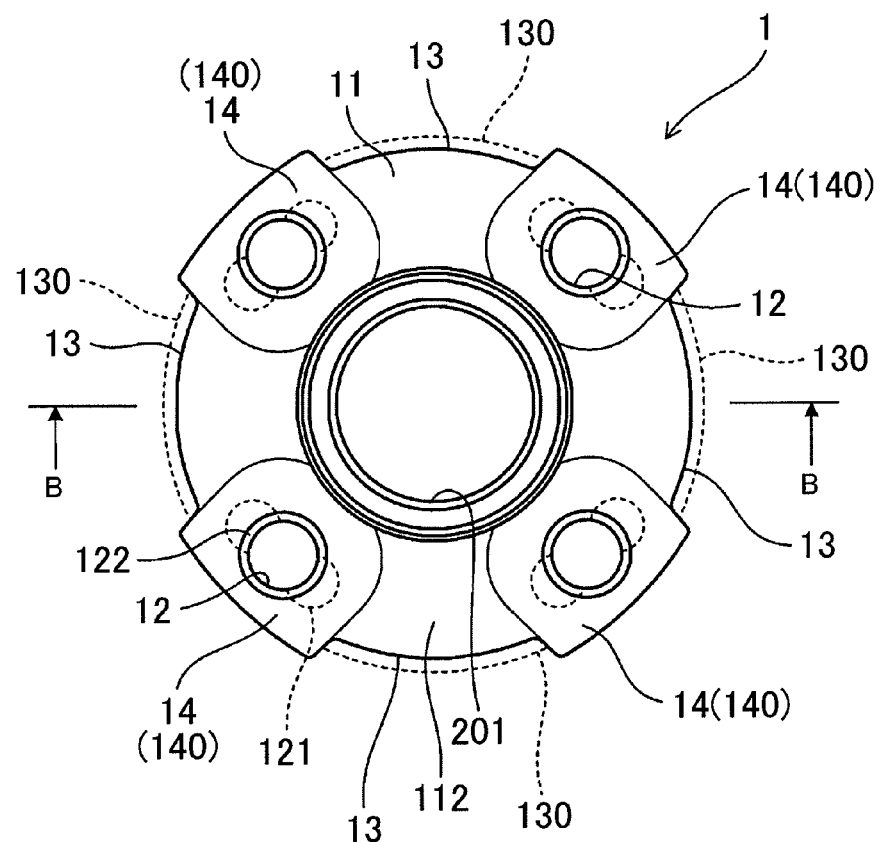
FIGS. 5A and 5B are drawings for explaining a spline member after the spline portion has been formed, according to the first exemplary embodiment.

The shaving punch 61 has a base plate abutting plane 612 that contacts the second surface 112 of the base plate portion 11 in the material 100. A coining process projecting portion 613 (projection not shown in the drawing) is provided on the base plate abutting plane 612, the coining process projecting portion 613 being used for applying a coining process to the second surface 112 of the base plate portion 11 with the pressing force of the shaving punch 61. The coining process projecting portion 613 has a shape that corresponds to the shape of coining process areas 140 (FIG. 5A).

A boss rear-end supporting portion 614 that supports a rear-end face 29 of the boss portion 2 is provided on the inner circumference side of the shaving punch 61. The boss rear-end supporting portion 614 is configured so as to move in synchronization with the shaving punch 61.

The shape of the outer circumferential surface 610 of the shaving punch 61 and the shape of the inner circumferential surface 620 of the shaving die 62 both correspond to the final exterior shape of the spline member 1 that is obtained.

The spline punch 63 is in the shape of a circular cylinder. In addition, a spline forming portion 631 having a shape that corresponds to the shape of the spline portion 3 is provided on the outer circumferential surface 630 of the spline punch 63. Further, the spline punch 63 has, on the front end thereof on the shaving punch 61 side, a tapered portion 632 that is tapered so as to make it easy for the spline punch 63 to be introduced along the inner circumferential surface 201 of the boss portion 2 in the material 100.

The stripper 64 is in the shape of a circular tube. The stripper 64 has a base plate supporting plane 641 that supports the first surface 111 of the base plate portion 11 in the material 100 and a boss outer circumference supporting plane 642 that supports the outer circumferential surface 202 of the boss portion 2.

The pressure receiving member 65 is in the shape of a circular tube. The pressure receiving member 65 has a pressure receiving plane 651 that contacts the stripper 64 and regulates the retreating movement of the stripper 64.

The manufacturing apparatus 6 according to the present exemplary embodiment is configured so that the shaving punch 61 is positioned above, whereas the shaving die 62 and the spline punch 63 are positioned below. The stripper 64 is positioned below the shaving punch 61. The pressure receiving member 65 is positioned below the stripper 64. The shaving die 62, the spline punch 63, and the pressure receiving member 65 are fixed.

The shaving punch 61 is configured so as to be able to advance and retreat in the axial direction. The stripper 64 is also configured so as to be able to advance and retreat in the axial direction on the inner circumference side of the shaving die 62, but the retreating movement thereof is regulated by the pressure receiving member 65. The knock-out member 66 is configured so as to be able to advance and retreat in the axial direction between the spline punch 63 and the pressure receiving member 65.

Next, a method for manufacturing the spline member 1 by using the manufacturing apparatus 6 described above will be explained.

First, as shown in FIG. 3, the first surface 111 of the base plate portion 11 and the outer circumferential surface 202 of the boss portion 2 in the material 100 are supported by the base plate supporting plane 641 and the boss outer circumference supporting plane 642 of the stripper 64, respectively.

After that, as shown in FIG. 4A, the shaving punch 61 is advanced relatively toward the stripper 64 so that the base plate abutting plane 612 in the punch portion 611 contacts the second surface 112 of the base plate portion 11, and the rear-end face 29 of the boss portion 2 is supported by the boss rear-end supporting portion 614.

The shaving punch 61 is further advanced relatively while the material 100 and the stripper 64 are being pressed, so that a shearing force is applied to the material 100 by the punch portion 611 of the shaving punch 61 and the shaving die 62. As a result, shaved areas 130 (FIG. 5A) of the material 100 are shaved so that four cutout portions 13 (FIG. 5A) are formed on the outer circumference portion of the base plate portion 11.

Then, as shown in FIG. 4B, the shaving punch 61 is advanced relatively while the outer circumferential surface 110 of the base plate portion 11 is held by the shaving die 62 so that the spline portion 3 is formed by inserting the spline forming portion 631 of the spline punch 63 along the inner circumferential surface 201 of the boss portion 2. As a result, the inner circumferential surface 201 of the boss portion 2 is plastically deformed, so that the spline portion 3 (FIG. 5B), in which the ridge portions 31 and the groove portions 32 are formed along the axial direction in such a manner that the ridge portions 31 and the groove portions 32 alternate, is formed from the spline base point surface 22.

Figure 4C:
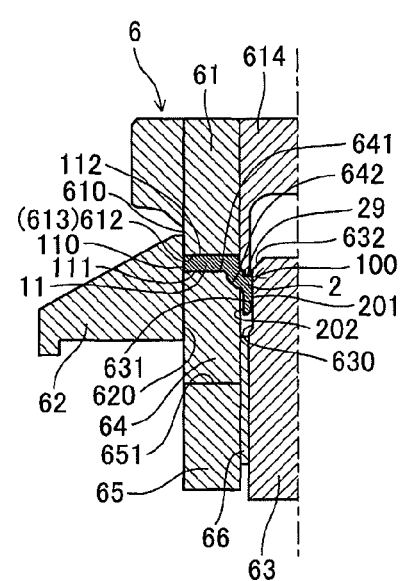

After that, as shown in FIG. 4C, the shaving punch 61 is further advanced relatively, so that the stripper 64 contacts the pressure receiving plane 651 of the pressure receiving member 65, and the retreating movement of the stripper 64 is stopped. Subsequently, a coining process is performed by having the coining process projecting portion 613 in the shaving punch 61 pressed against the coining process areas 140 (FIG. 5A) on the second surface 112 of the base plate portion 11. As a result, the coining process portions 14 (FIG. 5A) are formed on the second surface 112 of the base plate portion 11.

After that, although not shown in the drawings, the shaving punch 61 is caused to retreat, so that the knock-out member 66 advances in the retreating direction of the shaving punch 61. Subsequently, the spline member 1 (FIGS. 5A and 5B) is taken out of the manufacturing apparatus 6.

Figure 5B:
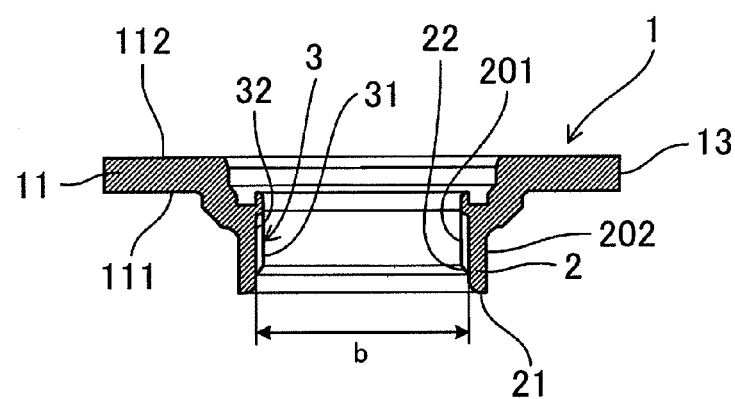

As a result, as shown in FIGS. 5A and 5B, the spline member 1 is obtained, the spline member 1 having the spline portion 3 including the ridge portions 31 and the groove portions 32 that are formed so as to alternate on the inner circumferential surface 201 of the boss portion 2. In the spline member 1, the four cutout portions 13 are formed on the outer circumference portion of the base plate portion 11. Also, the coining process portions 14 are formed on the second surface 112 of the base plate portion 11. The maximum inside diameter "b" of the spline portion 3 is 36.2 millimeters and is equal to the inside diameter of the groove portions 32 in the spline portion 3.

Figure 6A:
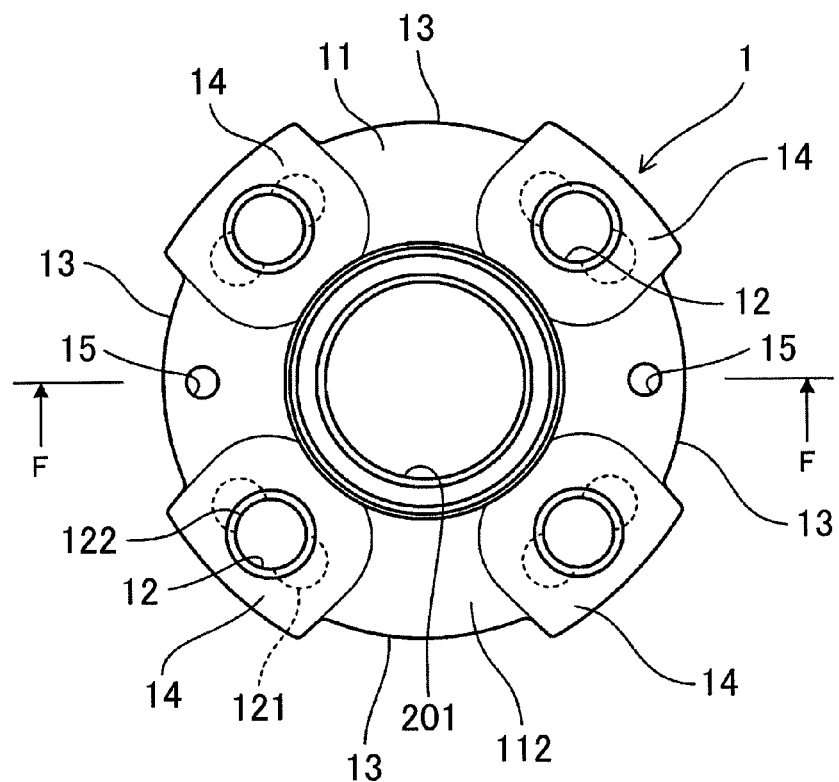
FIGS. 6A and 6B are drawings for explaining a spline member after cutting is performed, according to the first exemplary embodiment.
Figure 6B:
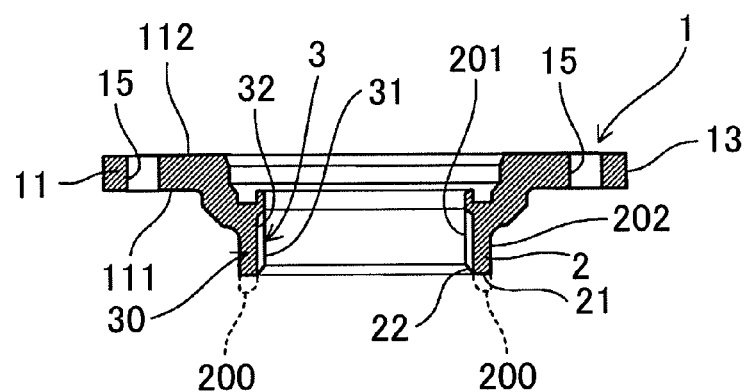

Lastly, as shown in FIGS. 6A and 6B, two second through holes 15 are formed in the base plate portion 11 of the spline member 1. After that, the front end surface 21 of the boss portion 2 is ground so that the shape of the front end surface 21 of the boss portion 2 is adjusted. In this situation, an unnecessary portion 200 of the boss portion 2 that is positioned on the front end side of the spline forming area 30 is cut off, while the spline forming portion 30 in the boss portion 2 remains uncut.

As a result of the processes described above, the spline member 1 (FIG. 1) has been finished.

Next, the operation and the effects of the manufacturing apparatus 6 according to the present exemplary embodiment will be explained.

The manufacturing apparatus 6 according to the present exemplary embodiment includes the shaving punch 61, the shaving die 62, the spline punch 63, and the stripper 64, which are positioned coaxially. By causing the shaving punch 61 to advance, the cutout portions 13 are formed on the outer circumference portion of the base plate portion 11 with the use of the shaving punch 61 and the shaving die 62. After that, by causing the shaving punch 61 to further advance, the spline portion 3 is formed by inserting the spline punch 63 along the inner circumferential surface 201 of the boss portion 2.

In other words, the manufacturing apparatus 6 is configured so that the forming of the cutout portion 13 and the forming of the spline portion 3 are coaxially and sequentially performed on the material 100 by one stroke of the shaving punch 61, while using the shaving punch 61, the shaving die 62, the spline punch 63, and the stripper 64 that are positioned coaxially. Thus, the obtained spline member 1 is able to achieve sufficient levels of coaxiality and positional precision of the cutout portions 13 with respect to the spline portion 3.

In addition, the manufacturing apparatus 6 according to the present exemplary embodiment is configured so that, after the cutout portions 13 are formed, the spline portion 3 is formed by causing the shaving punch 61 to advance relatively, while the outer circumferential surface 110 of the base plate portion 11 is held by the shaving die 62. In other words, it is possible to form the spline portion 3 while maintaining the axis and the positions of the cutout portions 13 that have been formed, because the outer circumferential surface 110 including the processed surface of the base plate portion 11 is held. As a result, it is possible to further enhance the levels of coaxiality and positional precision of the cutout portions 13 with respect to the spline portion 3.

For example, as shown in the second exemplary embodiment described later, in the case where the spline member 1 is used as a carrier cover for a planetary gear in an automatic transmission, the cutout portions 13 formed on the outer circumference portion of the base plate portion 11 serve as joint portions to be joined to the carrier. Thus, it is possible to improve the level of precision of the joint between the carrier cover and the carrier.

Further, according to the present exemplary embodiment, the manufacturing apparatus 6 includes the pressure receiving member 65 that regulates the retreating movement of the stripper 64 and is configured so that, after the spline portion 3 has been formed, the shaving punch 61 is further advanced relatively, so that the stripper 64 contacts the pressure receiving member 65 and the retreating movement of the stripper 64 is stopped, and also, the coining process is applied to the predetermined positions on the second surface 112 of the base plate portion 11 by the pressing force of the shaving punch 61.

As a result, with one stroke of the shaving punch 61, it is also possible to perform the coining process sequentially and coaxially, in addition to the forming of the cutout portion 13 and the forming of the spline portion 3. Consequently, the obtained spline member 1 is able to achieve a sufficient level of perpendicularity because each of the coining process portions 14 on the second surface 112 of the base plate portion 11 is inhibited from having a misaligned plane with respect to the spline portion 3.

Accordingly, as shown in the second exemplary embodiment described later, in the case where the spline member 1 is used as a carrier cover for a planetary gear in an automatic transmission, each of the coining process portions 14 in the base plate portion 11 serves as a seat for a washer of a pinion shaft. Thus, it is possible to improve the level of precision of the joint between the carrier cover and the pinion shaft.

As explained above, by using the manufacturing apparatus 6 according to the present exemplary embodiment, it is possible to manufacture the spline member 1 that is able to achieve sufficient levels of coaxiality and positional precision of the cutout portions 13 with respect to the spline portion 3.

Second Exemplary Embodiment

The second exemplary embodiment is an example in which the spline member 1 according to the first exemplary embodiment is incorporated as a carrier cover for a planetary gear 8.

Figure 7:
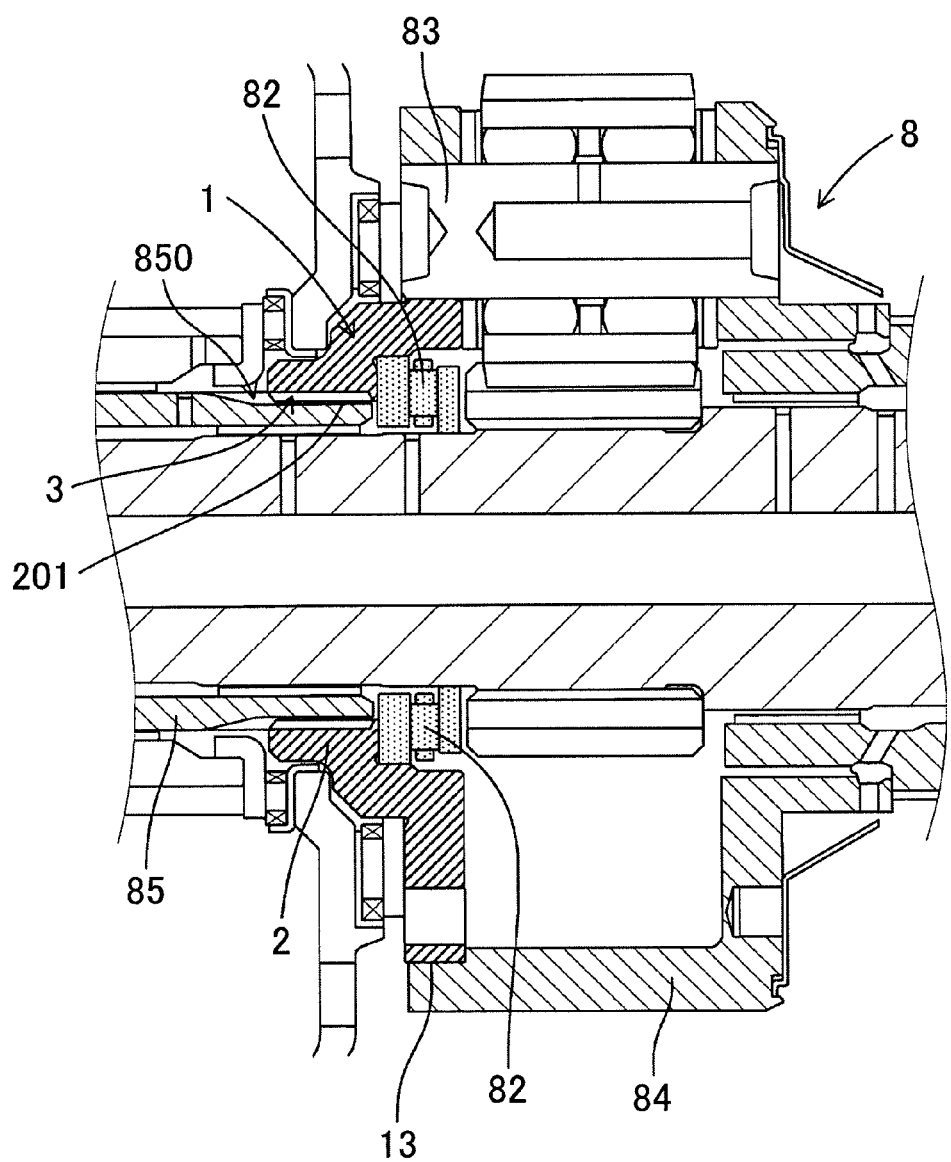
FIG. 7 is a drawing for explaining a structure of a planetary gear in which a spline member has been incorporated, according to a second exemplary embodiment.

As shown in FIG. 7, in the planetary gear 8, the spline member 1 serving as the carrier cover is provided on the outer circumference of a hollow shaft 81, via an input flange 85. Also, a bearing 82 is provided on the rear end side of the boss portion 2 in the spline member 1.

In addition, other members such as a pinion shaft 83 and a carrier 84 are joined to the spline member 1. Each of the coining process portions (not shown in the drawing) of the spline member 1 functions as a seat for a washer of the pinion shaft 83. Also, each of the cutout portions 13 functions as a welded portion that is welded to the carrier 84.

Further, the spline member 1 and the input flange 85 are engaged with each other, via their spline portions. In other words, a spline portion 850 is formed on the outer circumferential surface of the input flange 85, and the spline portion 850 is engaged with the spline portion 3 formed on the inner circumferential surface 201 of the boss portion 2 in the spline member 1.

In the planetary gear 8 according to the present exemplary embodiment, as explained above, the spline member 1 is used as the carrier cover, the spline member 1 being configured so as to be able to achieve sufficient levels of coaxiality and positional precision of the cutout portions 13 with respect to the spline portion 3. Thus, it is possible to improve the level of precision of the joint between the carrier cover (i.e., the spline member 1) and the carrier 84.

Further, the spline member 1 is able to achieve a sufficient level of perpendicularity by inhibiting each of the coining process portions from having a misaligned plane with respect to the spline portion 3. Thus, it is possible to improve the level of precision of the joint between the carrier cover (i.e., the spline member 1) and the pinion shaft 83.

As a result, it is possible to improve the quality of the entire planetary gear 8.

While this invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A spline member manufacturing apparatus that manufactures a spline member having a spline portion including ridge portions that are formed along an axial direction on an inner circumferential surface of a boss portion and groove portions that are formed between the ridge portions so that the ridge portions and the groove portions alternate, by using a material including a plate-like base plate portion and the boss portion that is in a shape of a circular tube and is provided so as to project from a first surface that is one of surfaces of the base plate portion, the spline member manufacturing apparatus comprising:

a shaving punch and a shaving die that are used for forming a cutout portion in at least a part of an outer circumference portion of the base plate portion;

a spline punch that is inserted along the inner circumferential surface of the boss portion and is used for forming the spline portion; and a stripper that supports the first surface of the base plate portion and an outer circumferential surface of the boss portion, wherein the shaving punch, the shaving die, the spline punch, and the stripper are positioned coaxially, while the stripper is positioned on an outer circumference side of the spline punch, whereas the shaving die is positioned on an outer circumference side of the stripper, and the shaving punch is positioned so as to be opposite to the stripper in the axial direction, the shaving punch being provided so as to be movable in the axial direction relative to the shaving die and the spline punch, and the stripper being provided so as to make a relative retreating movement due to a pressing force of the shaving punch, the stripper supports the first surface of the base plate portion and the outer circumferential surface of the boss portion, the shaving punch is relatively advanced toward the stripper and contacts a second surface of the base plate portion, the second surface being a surface on an opposite side of the first surface, and the shaving punch is further advanced relatively, while the material and the stripper are being pressed, and a shearing force is applied to the material by the shaving punch and the shaving die, so that the cutout portion is formed in at least a part of the outer circumference portion of the base plate portion, and after the cutout portion is formed in at least the part of the outer circumference portion of the base plate portion, the shaving punch is further advanced relatively, while an outer circumferential surface of the base plate portion is held by the shaving die, so that the spline portion is formed by inserting the spline punch along the inner circumferential surface of the boss portion.

2. The spline member manufacturing apparatus according to claim 1, further comprising:

a pressure receiving member that stops the retreating movement of the stripper, wherein after the spline portion has been formed, the shaving punch is further advanced relatively so that the stripper contacts the pressure receiving member and the retreating movement of the stripper is stopped, and a coining process is applied to a predetermined position on the second surface of the base plate portion by the pressing force of the shaving punch.

3. The spline member manufacturing apparatus according to claim 1, wherein the boss portion is formed by a burring process.

4. A spline member manufacturing method using the spline member manufacturing apparatus according to claims 1, the spline member manufacturing method comprising:

supporting the material by causing the stripper to support the first surface of the base plate portion and the outer circumferential surface of the boss portion;

causing the shaving punch to advance relatively toward the stripper and to abut against the second surface of the base plate portion, causing the shaving punch to further advance relatively, while pressing the material and the stripper, and applying the shearing force to the material with the shaving punch and the shaving die, so that the cutout portion is formed in at least a part of the outer circumference portion of the base plate portion; and after forming the cutout portion in at least the part of the outer circumference portion of the base plate portion, forming the spline portion by causing the shaving punch to further advance relatively, while having the outer circumferential surface of the base plate portion held by the shaving die, so that the spline portion is formed by inserting the spline punch along the inner circumferential surface of the boss portion.

5. The spline member manufacturing method according to claim 4, wherein, after forming the spline portion, causing the shaving punch to further advance relatively so that the stripper contacts the pressure receiving member and the retreating movement of the stripper is stopped, and applying the coining process to the predetermined position on the second surface of the base plate portion with the pressing force of the shaving punch.

6. The spline member manufacturing method according to claim 4, wherein the spline member is a carrier cover for a planetary gear in an automatic transmission.

* * * * *